(12) United States Patent
Tomiyama

(10) Patent No.: US 12,212,723 B2
(45) Date of Patent: Jan. 28, 2025

(54) IMAGE FORMING APPARATUS AND CONTROL METHOD USING IMAGE FORMING DATA FILE

(71) Applicant: Toshiba Tec Kabushiki Kaisha, Tokyo (JP)

(72) Inventor: Takashi Tomiyama, Sunto Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/391,105

(22) Filed: Dec. 20, 2023

(65) Prior Publication Data

US 2024/0275897 A1  Aug. 15, 2024

(30) Foreign Application Priority Data

Feb. 14, 2023  (JP) .................................. 2023-020722

(51) Int. Cl.
*H04N 1/00* (2006.01)
*H04N 1/32* (2006.01)

(52) U.S. Cl.
CPC ..... *H04N 1/00973* (2013.01); *H04N 1/00342* (2013.01); *H04N 1/32138* (2013.01)

(58) Field of Classification Search
None
See application file for complete search history.

(56) References Cited

U.S. PATENT DOCUMENTS

| 2010/0259797 | A1* | 10/2010 | Shimizu | H04N 1/32138 |
|---|---|---|---|---|
| | | | | 358/442 |
| 2018/0239289 | A1* | 8/2018 | Takada | H04N 1/00612 |
| 2021/0232779 | A1* | 7/2021 | Saito | G06K 7/10019 |
| 2021/0234976 | A1* | 7/2021 | Oishi | H04N 1/00602 |
| 2021/0289083 | A1* | 9/2021 | Takada | H04N 1/00342 |
| 2022/0197733 | A1* | 6/2022 | Tomiyama | G06F 11/0733 |
| 2022/0292320 | A1* | 9/2022 | Suzuki | G06K 15/4065 |

FOREIGN PATENT DOCUMENTS

| JP | 2005-316189 A | | 11/2005 |
|---|---|---|---|
| JP | 2007213298 A | * | 8/2007 |
| JP | 2009-294761 A | | 12/2009 |
| JP | 2010-102735 A | | 5/2010 |
| JP | 2010-214832 A | | 9/2010 |

* cited by examiner

*Primary Examiner* — Henok Shiferaw
(74) *Attorney, Agent, or Firm* — FOLEY & LARDNER LLP

(57) ABSTRACT

An image forming apparatus includes a forming device, a wireless tag communication device, an external communication interface, and a processor. The forming device forms an image on a sheet including a wireless tag. The wireless tag communication device performs wireless communication with the wireless tag included in the sheet. The external communication interface acquires an image forming data file from another device through communication. The processor forms the image on the sheet by controlling the forming device based on information included in the image forming data file if the image forming data file includes an instruction for image formation, and sets parameters of the wireless tag communication device based on information included in the image forming data file if the image forming data file includes an instruction for wireless tag communication setting.

15 Claims, 6 Drawing Sheets

IMAGE FORMING APPARATUS AND CONTROL METHOD USING IMAGE FORMING DATA FILE

CROSS-REFERENCE TO RELATED APPLICATION

This application is based upon and claims the benefit of priority from Japanese Patent Application No. 2023-020722, filed on Feb. 14, 2023, the entire contents of which are incorporated herein by reference.

FIELD

Embodiments described herein relate generally to an image forming apparatus and a control method.

BACKGROUND

An image forming apparatus is known that forms an image on a sheet having a wireless tag attached thereto using wireless communication technology such as radio frequency identification (RFID). A technique has been proposed in which such an image forming apparatus includes a wireless tag communication device to write data to and read data from a wireless tag of a sheet to be processed by the image forming apparatus. In such a technique, it is necessary to appropriately set parameters to prevent data from being erroneously read from or written to a wireless tag of a sheet that is not a target of processing. For example, it is desirable that the strength of a signal transmitted when detecting a wireless tag and a threshold value used to determine a wireless tag to be processed be appropriately set as parameters. It has not been easy to appropriately set such parameters, however.

DETAILED DESCRIPTION

A problem to be solved by the present disclosure is to provide an image forming apparatus and a control method that make it possible to more easily set appropriate parameters in a wireless communication device that communicates with a wireless tag attached to a sheet that is a target for image formation.

In general, according to at least one embodiment, an image forming apparatus includes a forming device, a wireless tag communication device, an external communication interface, and a processor. The forming device forms an image on a sheet including a wireless tag. The wireless tag communication device performs wireless communication with the wireless tag included in the sheet. The external communication interface acquires an image forming data file from another device through communication. The processor forms the image on the sheet by controlling the forming device based on information included in the image forming data file when the image forming data file includes an instruction for image formation, and sets parameters of the wireless tag communication device based on information included in the image forming data file when the image forming data file includes an instruction for wireless tag communication setting.

Figure 1:
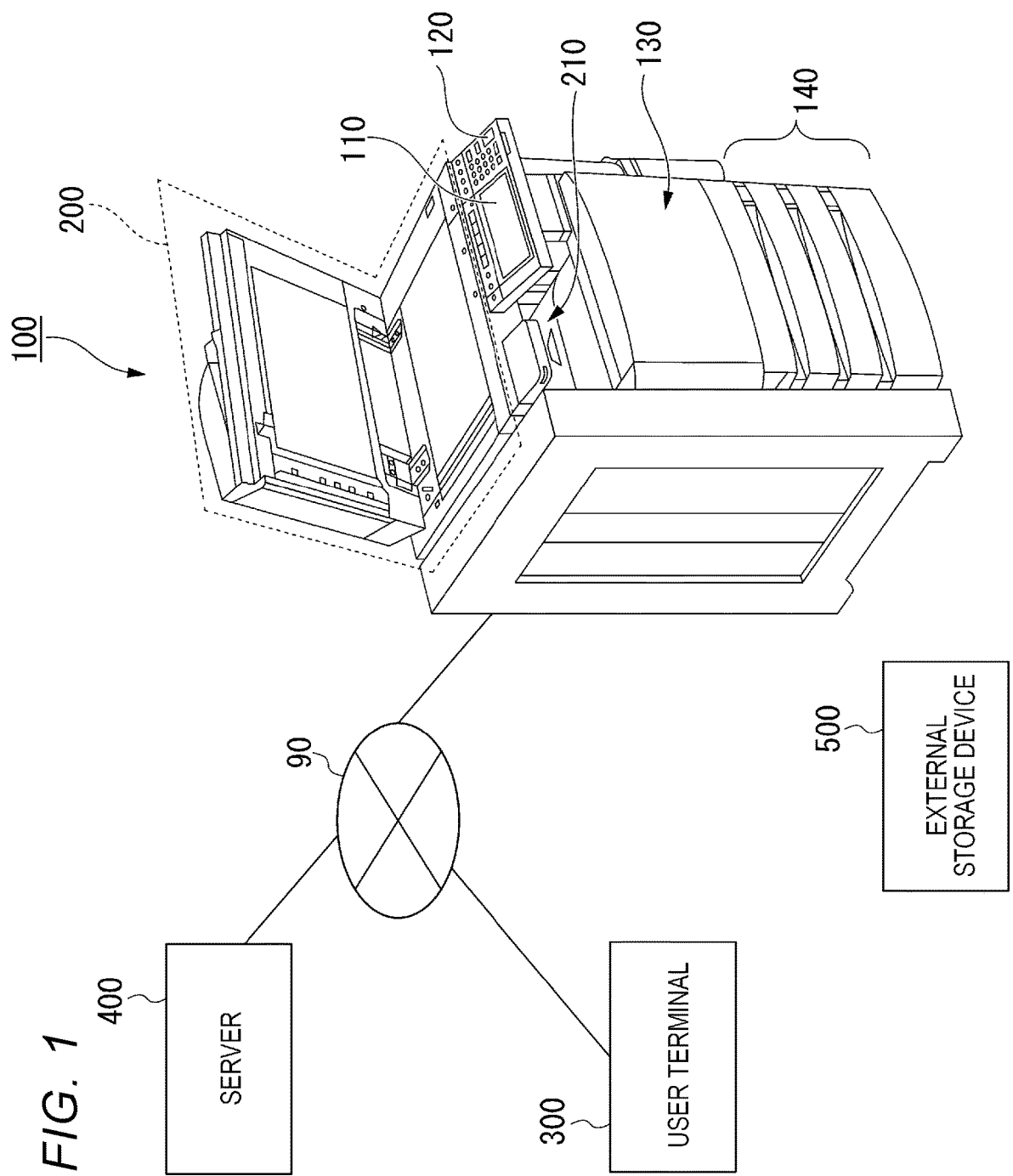
FIG. 1 is an appearance view illustrating an example of an overall configuration of an image forming apparatus 100 according to at least one embodiment.

FIG. 1 is an appearance view illustrating an example of an overall configuration of an image forming apparatus 100 according to at least one embodiment. The image forming apparatus 100 is, for example, a multifunction apparatus. The image forming apparatus 100 includes a display 110, a control panel 120, a forming device 130, a sheet accommodation device 140, and an image reading device 200. The forming device 130 of the image forming apparatus 100 may be an electrophotographic device that fixes a toner image, an inkjet-type device, or other types of devices.

The image forming apparatus 100 may be communicably connected to other information processing apparatuses via a network 90. The image forming apparatus 100 may communicate with a user terminal 300 or a server 400 via the network 90, as illustrated in FIG. 1, for example. The network 90 may be a network using wireless communication or a network using wired communication. The network 90 may be configured by combining a plurality of networks.

The user terminal 300 is an information processing apparatus such as a personal computer, a smartphone, or a tablet. The user terminal 300 is operated by a user and operates according to an operation. The user terminal 300 transmits, for example, an image forming data file to the image forming apparatus 100 in response to the user's operation. The image forming data file is data in a predetermined format for instructing the image forming apparatus 100 to form an image and write data to a wireless tag in the image forming apparatus 100. The image forming data file may be configured as, for example, a print data file.

The user terminal 300 stores a setting data file configured in the format of an image forming data file. The setting data file is data used when the image forming apparatus 100 performs setting so that data can be read from and written to an appropriate wireless tag. Hereinafter, setting performed by the image forming apparatus 100 to read data from and write data to an appropriate wireless tag will be referred to as calibration. The setting data file includes parameters used to read data from and write data to an appropriate wireless tag. Details of the setting data file will be described later. If the user performs an operation of giving an instruction to perform setting processing, the user terminal 300 transmits the setting data file to the image forming apparatus 100 in response to the operation.

The server 400 is an information processing apparatus such as a server device. The server 400 stores the above-mentioned setting data file. The server 400 transmits the setting data file to a device that accesses a predetermined address via the network 90. For example, if the server 400 receives information for requesting a setting data file along with type information indicating the type of sheet having a wireless tag attached thereto from the image forming apparatus 100, the server 400 may read the setting data file according to the type information and transmit the setting data file to the image forming apparatus 100.

An external storage device 500 is a storage device such as a magnetic storage device or a semiconductor storage device. The external storage device 500 is configured to be attachable to or detachable from other information processing apparatuses. The external storage device 500 is configured to be attachable to or detachable from, for example, the image forming apparatus 100. The external storage device 500 may be configured using, for example, a universal serial bus (USB) memory. The external storage device 500 stores the above-mentioned setting data file.

In this manner, the image forming apparatus 100 can acquire the setting data file from at least one of the user terminal 300, the server 400, and the external storage device 500. Next, the image forming apparatus 100 will be described.

The image forming apparatus 100 forms an image on a sheet using a toner or ink. The sheet is, for example, paper or label paper. The sheet may be a sheet to which a wireless tag is attached. The sheet may be any material as long as the image forming apparatus 100 can form an image on the surface thereof. The sheet to which the wireless tag is attached may be a sheet to which a wireless tag is attached to the surface of the sheet, or a sheet in which a wireless tag is embedded thereinside. The wireless tag in at least one embodiment is a wireless tag using RFID technology and is also referred to as an RF tag.

The display 110 is an image display device such as a liquid crystal display or an organic electro luminescence (EL) display. The display 110 displays various information regarding the image forming apparatus 100.

The control panel 120 includes a plurality of buttons. The control panel 120 receives the user's operations. The control panel 120 outputs a signal corresponding to the operation performed by the user to a processor 153 of the image forming apparatus 100. The display 110 and the control panel 120 may be configured as an integrated touch panel.

The forming device 130 forms an image on a sheet based on image information generated by the image reading device 200 or image information received via a communication channel (for example, the network 90). The forming device 130 forms an image by, for example, the following processing. The forming device 130 forms an electrostatic latent image on a photoreceptor drum based on the image information. The forming device 130 forms a visible image by attaching a developer to the electrostatic latent image. A specific example of the developer is one using a toner. The forming device 130 transfers the visible image to the sheet. The forming device 130 fixes the visible image on the sheet by applying heat and pressure to the sheet. The sheet on which the image is formed may be a sheet stored in the sheet accommodation device 140 or may be a sheet manually fed. The sheet on which the image is formed is discharged to a sheet discharge area 210. Image formation on the sheet is not limited to using the above-mentioned toner. For example, image formation on the sheet may be performed using an inkjet method.

The sheet accommodation device 140 stores sheets used for image formation in the forming device 130. In the sheet accommodation device 140 of one image forming apparatus 100, one sheet feed cassette or a plurality of sheet feed cassettes may be provided. In at least one embodiment, the sheet accommodation device 140 is provided with four sheet feed cassettes.

The image reading device 200 reads image information to be read based on brightness and darkness of light. The image reading device 200 records the read image information. The recorded image information may be transmitted to another information processing apparatus (for example, the user terminal 300) via the network 90. The recorded image information may be formed into an image on a sheet by the forming device 130.

Figure 2:
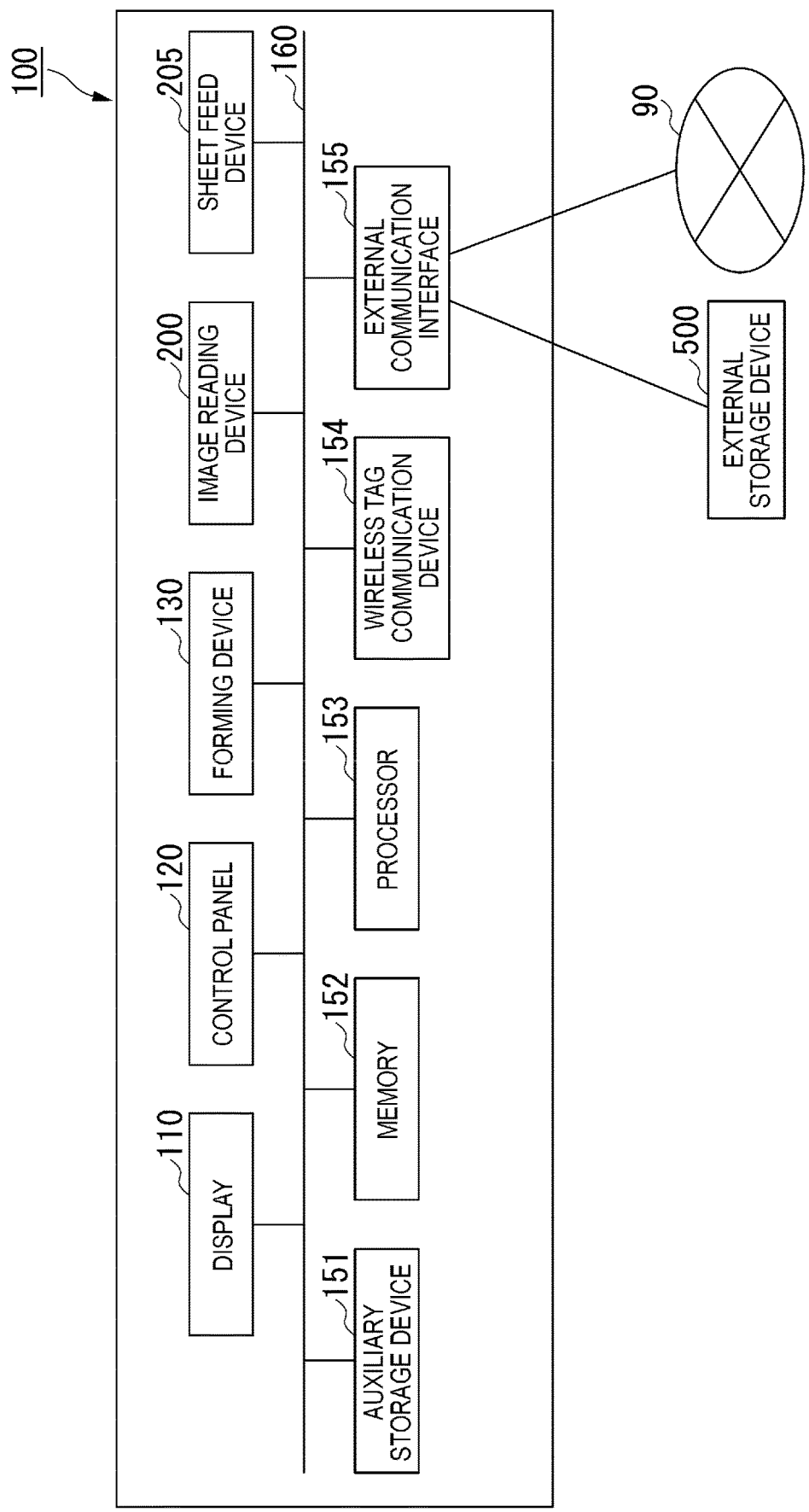
FIG. 2 is a block diagram illustrating a hardware configuration of the image forming apparatus 100.

FIG. 2 is a block diagram illustrating a hardware configuration of the image forming apparatus 100 according to at least one embodiment. The image forming apparatus 100 includes the display 110, the control panel 120, the forming device 130, a sheet feed device 205, an auxiliary storage device 151, a memory 152, the processor 153, a wireless tag communication device 154, an external communication interface 155, and the image reading device 200. These devices are connected to each other via a system bus 160 so as to be able to perform data communication. The display 110, the control panel 120, the forming device 130, and the image reading device 200 are described above, and thus descriptions thereof will be omitted.

The sheet feed device 205 is a mechanism that feeds sheets placed on the sheet accommodation device 140 and a manual tray, which will be described later, to the forming device 130. The auxiliary storage device 151, the memory 152, the processor 153, the wireless tag communication device 154, and the external communication interface will be described below.

The auxiliary storage device 151 is, for example, a hard disk or a solid state drive (SSD), and stores various data. The auxiliary storage device 151 may store, for example, a software program for controlling the operation of each device included in the image forming apparatus 100.

The memory 152 temporarily stores data used by each device included in the image forming apparatus 100. The memory 152 is, for example, a random access memory (RAM). The memory 152 may store digital data generated by the image reading device 200. The memory 152 may temporarily store an image forming data file being printed by the forming device 130 and written information written to a wireless tag.

The processor 153 controls the operation of each device included in the image forming apparatus 100. The processor 153 may execute processing by loading the software program stored in the auxiliary storage device 151 onto the memory 152 and executing the software program. Specific processing of the processor 153 will be described using an example.

If the processor 153 receives an image forming data file from an external information processing apparatus (for example, the user terminal 300 or the server 400) or reads the image forming data file from the external storage device 500 in response to an operation performed on the control panel 120, the processor 153 controls image formation for a sheet having a wireless tag attached thereto based on the read image forming data file.

The wireless tag communication device 154 performs data reading and data writing by performing wireless communication with the wireless tag.

The external communication interface 155 performs data communication with an external device (device different from the image forming apparatus 100). The external communication interface 155 may be configured as a physical interface from which other devices such as the external storage device 500 can be detachable, or may be configured as a communication device that communicates data with an external device via a network. The external communication interface 155 may be configured in accordance with, for example, a USB protocol. The external communication interface 155 may perform data communication with other information processing apparatuses (for example, the user terminal 300 or the server 400) via the network 90. The external communication interface 155 transmits data, for example, under the control of the processor 153. For example, if the external communication interface 155 receives data, the external communication interface 155 transmits the received data to the processor 153.

Figure 3:
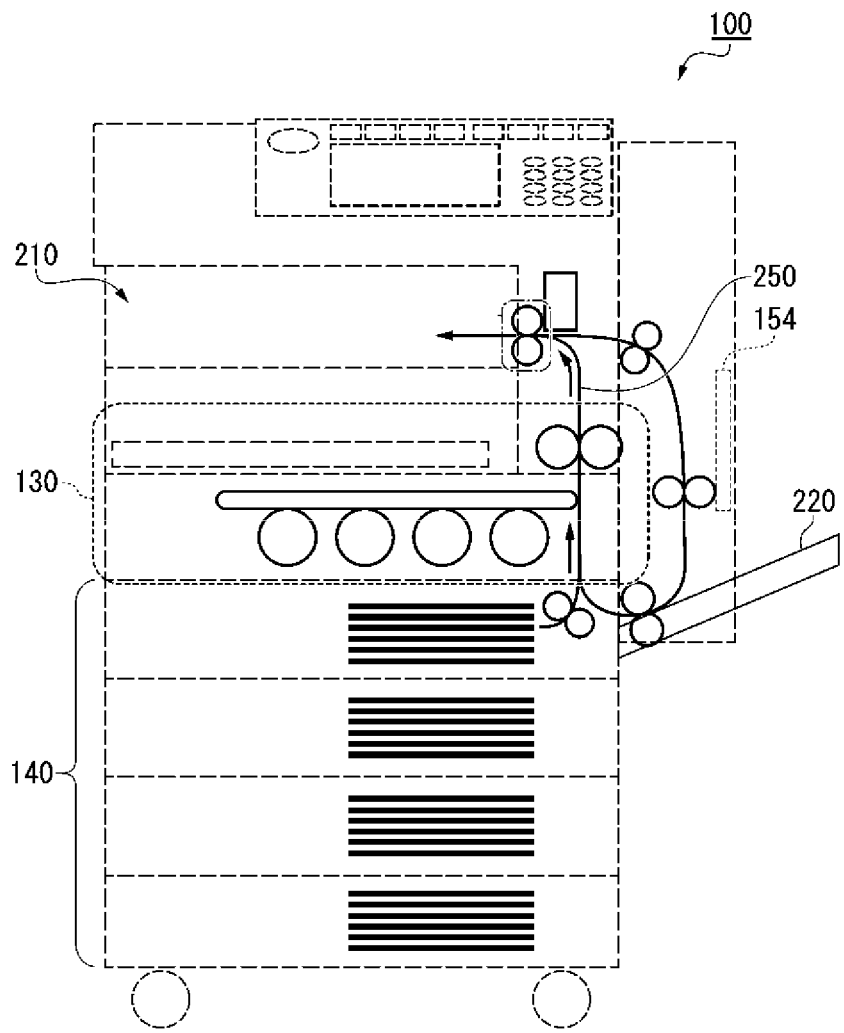
FIG. 3 is a diagram illustrating an internal configuration of the image forming apparatus 100.

FIG. 3 is a diagram illustrating an internal configuration of the image forming apparatus 100. In FIG. 3, a manual feed tray 220 is newly illustrated. A sheet is taken into a conveyance path 250 from the sheet accommodation device 140 or the manual feed tray 220. The conveyance path 250 includes a plurality of conveyance rollers. The conveyance roller rotates under the control of the processor 153 and conveys the sheet located on the conveyance path. The sheet is conveyed along the conveyance path 250, an image is formed on the sheet by the forming device 130, and the sheet is discharged to the sheet discharge area 210 by a sheet discharge roller 156. The wireless tag communication device 154 communicates with a wireless tag of the sheet being conveyed along the conveyance path 250.

Figure 4:
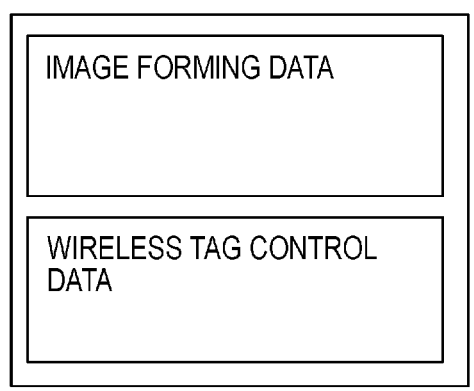
FIG. 4 is a diagram illustrating a specific example of an image forming data file.

FIG. 4 is a diagram illustrating a specific example of the image forming data file. The image forming data file includes, for example, image forming data and wireless tag control data. The image forming data is data for causing the image forming apparatus 100 to form an image on the sheet. The image forming data includes, for example, data indicating images and characters to be formed on a sheet, and various parameters for image formation (information such as a resolution and a paper size). The wireless tag control data is data indicating processing to be performed on the wireless tag. A specific example of the wireless tag control data is data for executing processing for writing information to the wireless tag.

Figure 5:
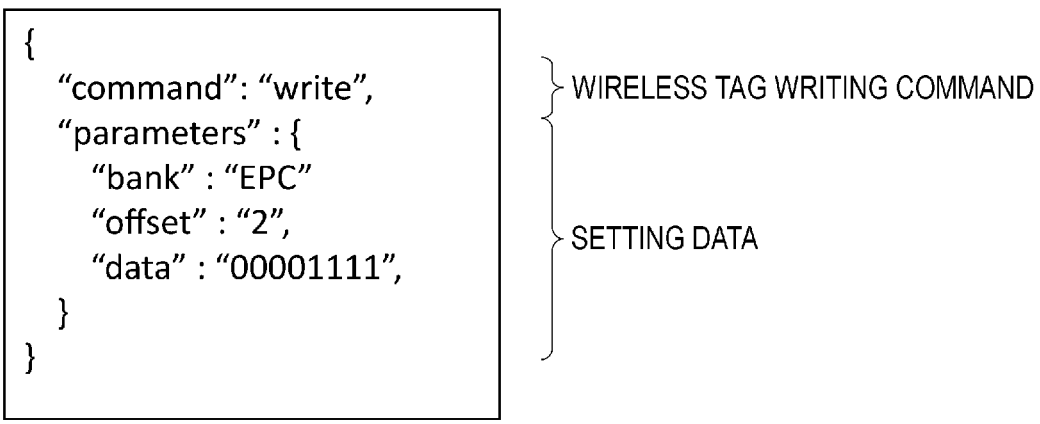
FIG. 5 is a diagram illustrating a specific example of wireless tag control data.

FIG. 5 is a diagram illustrating a specific example of the wireless tag control data. The wireless tag control data illustrated in FIG. 5 is data for executing the processing for writing information to the wireless tag. A character string shown as a wireless tag writing command in FIG. 5 indicates causing the wireless tag communication device 154 to execute the processing for writing data to the wireless tag. Setting data in FIG. 5 shows the content of data written to the wireless tag.

Figure 6:
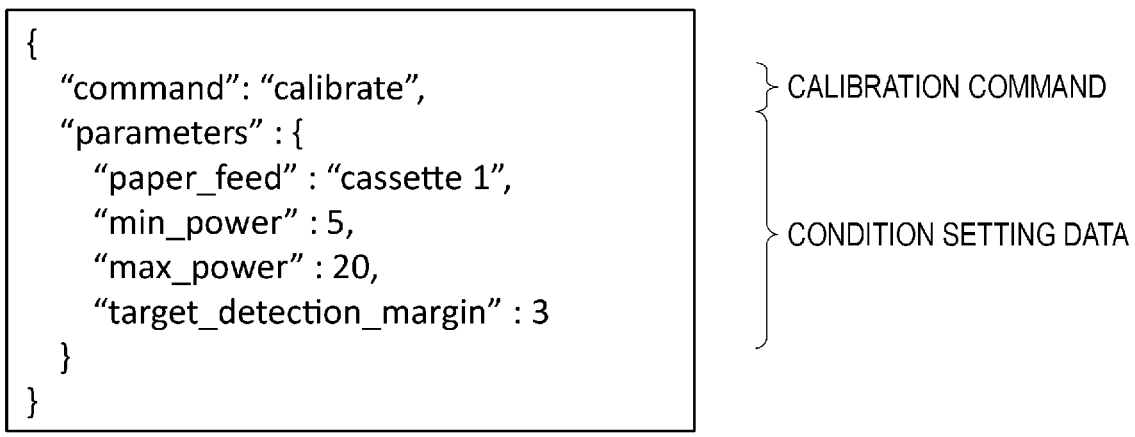
FIG. 6 is a diagram illustrating a specific example of wireless tag control data in a setting data file.

FIG. 6 is a diagram illustrating a specific example of wireless tag control data in a setting data file. Since the setting data file has the same file format as that of the image forming data file, the setting data file includes image forming data and wireless tag control data as illustrated in FIG. 4. In this manner, the format of the setting data file illustrated in FIG. 6 is the same format as that of the image forming data file for executing the processing for wiring data to the wireless tag as illustrated in FIG. 5.

As illustrated in FIG. 6, the wireless tag control data in the setting data file includes a character string of a calibration command instead of the wireless tag writing command. The wireless tag control data in the setting data file includes parameters used for calibration (setting) following the character string of the calibration command. Specific examples of such parameters include information indicating a sheet feed cassette from which sheets are supplied, minimum and maximum outputs of transmission power of a wireless signal transmitted from the wireless tag communication device 154 to a wireless tag, a threshold value used to determine a wireless tag to be processed, and the like.

Figure 7:
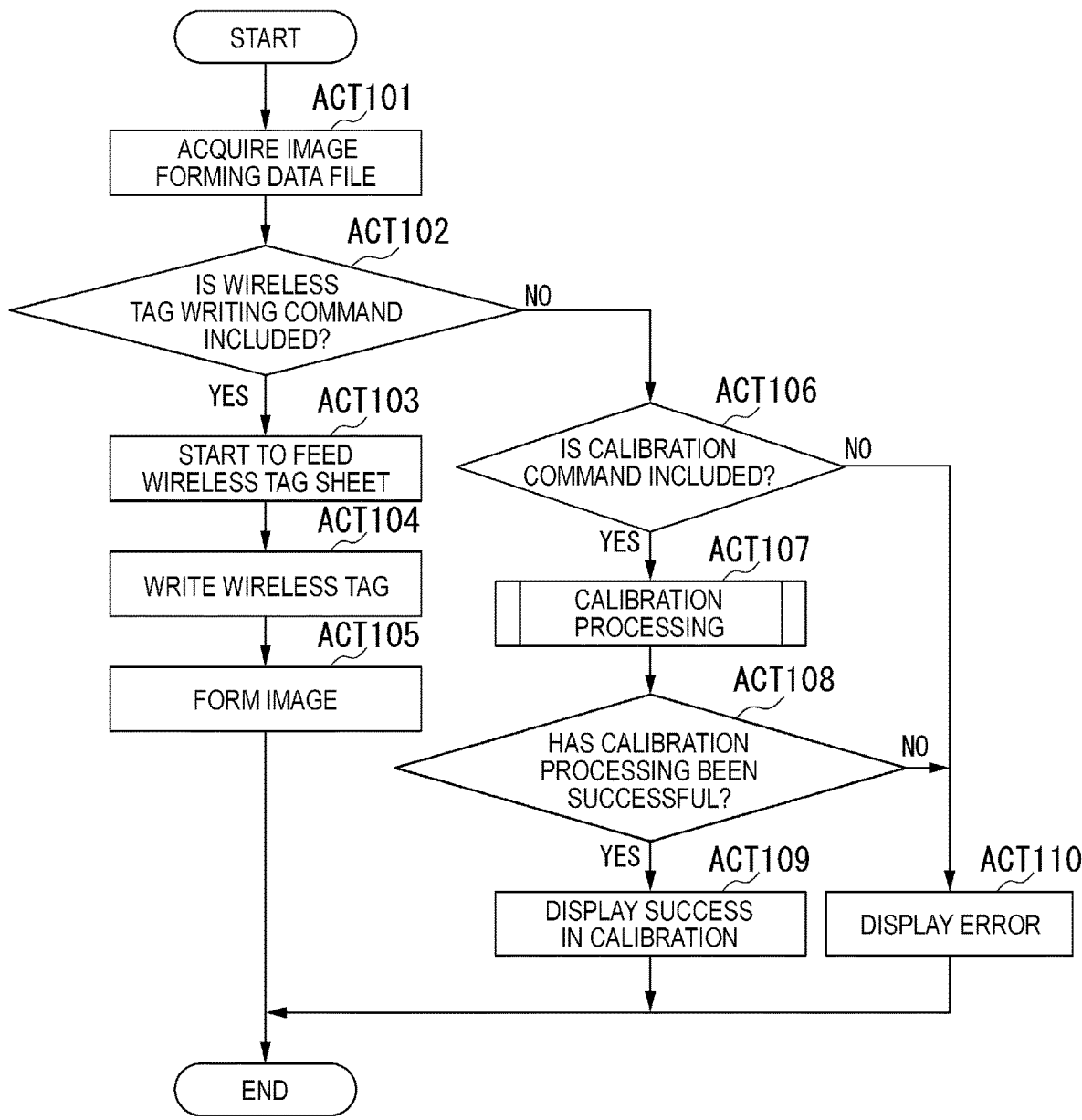
FIG. 7 is a flowchart showing a specific example of a flow of processing of the image forming apparatus 100 if calibration is executed.

FIG. 7 is a flowchart showing a specific example of a flow of processing of the image forming apparatus 100 if calibration is executed. The processor 153 acquires an image forming data file (ACT101). If the processor 153 acquires the image forming data file, the acquisition may be realized, for example, by the following processing.

The user may transmit image forming data from the user terminal 300 to the image forming apparatus 100 via the network 90 by operating the user terminal 300. In this case, the image forming data file may be stored in the user terminal 300, or the user terminal 300 may acquire the image forming data file from another information storage device or medium. In particular, the setting data file may be transmitted from the user terminal 300 to the image forming apparatus 100 in this manner.

The user may connect to the server 400 by operating the image forming apparatus 100 and download the image forming data from the server 400 to the image forming apparatus 100 via the network 90. In this case, the image forming data file may be stored in the server 400, or the server 400 may acquire the image forming data file from another information storage device or medium. In particular, the setting data file may be transmitted from the server 400 to the image forming apparatus 100 in this manner. An address of the server 400 which is used when operating the image forming apparatus 100 to connect to the server 400 may be stored in the image forming apparatus 100 in advance, for example. For example, the image forming apparatus 100 may transmit request information for requesting the setting data file to the address of the server 400. This request information may include type information indicating the type of target wireless tag sheet.

The address of the server 400 may be recorded on other media. For example, the address of the server 400 that stores a setting data file for communicating with a wireless tag of a wireless tag sheet may be recorded on wrapping paper of the wireless tag sheet. The address may be recorded, for example, by printing a character string indicating the URL, or by printing an encoded image (for example, a one-dimensional barcode, a two-dimensional barcode, or the like) indicating the URL. The encoded image may include type information indicating the type of wireless tag sheet wrapped in the wrapping paper. The user may input the URL by operating the control panel 120 of the image forming apparatus 100. The address may be acquired by causing the user to input the encoded image to the image forming apparatus 100 using the image reading device 200 and causing the processor 153 of the image forming apparatus 100 to decode the encoded image.

The user may read the image forming data from the external storage device 500 to the image forming apparatus 100 by connecting the external storage device 500 that records the image forming data file to the external communication interface 155 and operating the image forming apparatus 100. In particular, the setting data file may be read from the external storage device 500 to the image forming apparatus 100 in this manner.

The processor 153 determines whether wireless tag control data included in the acquired image forming data file includes a wireless tag writing command (ACT102). If the wireless tag control data includes the wireless tag writing command (ACT102-YES), the processor 153 starts to feed a sheet including a wireless tag (hereinafter referred to as a "wireless tag sheet") (ACT103). The processor 153 conveys the wireless tag sheet through the conveyance path 250 and writes information to a wireless tag of the wireless tag sheet by transmitting a wireless signal (ACT104). The processor 153 controls the forming device 130 to form an image on the sheet in accordance with the image forming data included in the image forming data file (ACT105).

If the wireless tag control data does not include the wireless tag writing command (ACT102-NO), the processor 153 determines whether the wireless tag control data included in the acquired image forming data file includes a calibration command (ACT106). If the wireless tag control data includes the calibration command (ACT106-YES), the processor 153 controls the wireless tag communication device 154 to execute calibration processing (ACT107). Details of the calibration processing will be described later using FIG. 8.

If the execution of the calibration processing is successful (ACT108-YES), the processor 153 displays the success in the calibration on the display 110 (ACT109). On the other hand, if the calibration command is not included in ACT106 (ACT106-NO) or if the execution of the calibration processing is not successful (ACT108-NO), the processor 153 displays an error on the display 110 (ACT110). In this manner, the processing of the flowchart illustrated in FIG. 7 is terminated.

Figure 8:
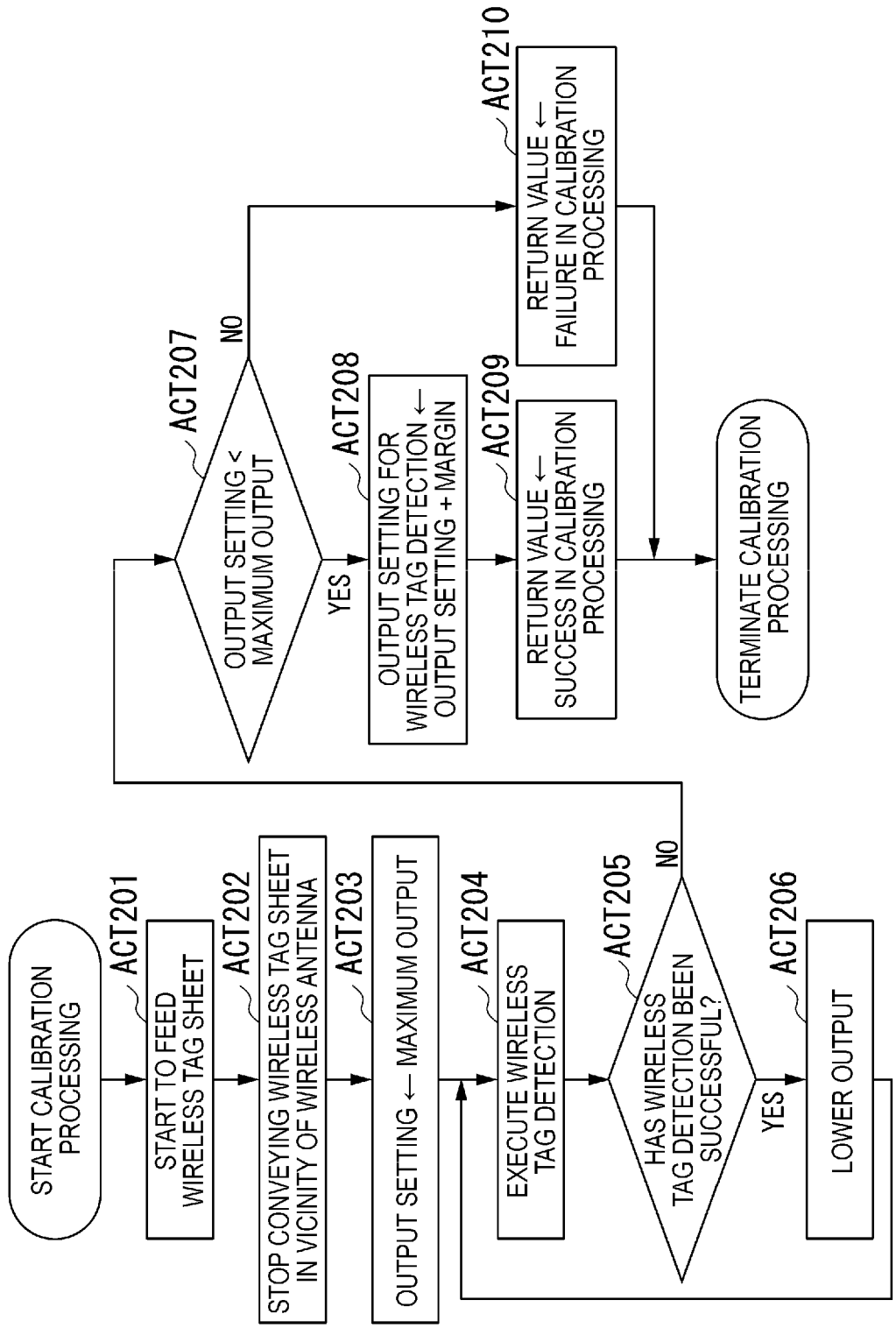
FIG. 8 is a flowchart showing a specific example of a flow of calibration processing.

FIG. 8 is a flowchart illustrating a specific example of a flow of the calibration processing. The processor 153 starts to feed the wireless tag sheet by controlling the sheet feed device 205 corresponding to a cassette accommodating the wireless tag sheet (ACT201). The processor 153 controls the rotation of the conveyance roller to convey the wireless tag sheet to the vicinity of an antenna of the wireless tag communication device 154 and stop the conveyance (ACT202). The processor 153 controls the wireless tag communication device 154 and sets the maximum output among the parameters included in the calibration command to be an output of the wireless tag communication device 154 (ACT203). The processor 153 executes wireless tag detection processing in the wireless tag communication device 154 (ACT204). If the detection of the wireless tag is successful in the wireless tag communication device 154 (ACT205-YES), the processor 153 lowers the output of the wireless tag communication device 154 and returns to the processing of ACT204 to repeat the processing.

If the detection of the wireless tag is not successful in the wireless tag communication device 154 (ACT205-NO), the processor 153 determines whether the output of the wireless tag communication device 154 is less than the maximum output among the parameters included in the calibration command (ACT207). If the output of the wireless tag communication device 154 is equal to or greater than the maximum output (ACT207-NO), the processor 153 outputs the failure in the execution of the calibration processing and terminates the calibration processing (ACT210).

If the output of the wireless tag communication device 154 is less than the maximum output (ACT207-YES), the processor 153 sets a value obtained by adding a predetermined margin to the value of the output setting at that point in time as an output for wireless tag detection (ACT208). Then, the processor 153 outputs the success of the execution of the calibration processing and terminates the calibration processing (ACT209).

In the image forming apparatus 100 configured as described above, it is possible to more easily set appropriate parameters in a wireless communication device that communicates with a wireless tag attached to a sheet that is a target for image formation. Specific details are as follows.

If appropriate parameters are set in the wireless tag communication device 154, the image forming apparatus 100 does not set the appropriate parameters individually, but the setting of the appropriate parameters is performed by causing the image forming apparatus 100 to acquire a setting data file recorded in another device. For example, such a setting data file may be transmitted to the image forming apparatus 100 from the user terminal 300, may be downloaded (received) from the server 400 by operating the image forming apparatus 100, or may be read by connecting the external storage device 500 (for example, a USB memory) to the image forming apparatus 100. The setting data file may be input to the image forming apparatus 100 in other ways. In this manner, the user can easily acquire the setting data file including the appropriate parameters.

If the image forming apparatus 100 acquires the setting data file, the image forming apparatus 100 sets appropriate parameters in the wireless tag communication device 154 of the image forming apparatus 100 based on information included in the setting data file. For example, the processor 153 of the image forming apparatus 100 sets parameters in the wireless tag communication device 154 based on the content of wireless tag control data in the setting data file. More specific details are as follows. If the wireless tag control data in the setting data file includes a character string indicating a calibration command, the processor 153 accordingly reads the subsequently recorded calibration parameters and sets the parameters in the wireless tag communication device 154. For this reason, the user can more easily execute the setting of the parameters.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. An image forming apparatus comprising:
   a forming device configured to form an image on a sheet, the sheet including a wireless tag;
   a wireless tag communication device configured to perform wireless communication with the wireless tag included in the sheet;
   an external communication interface configured to acquire an image forming data file from another device through communication; and
   a processor configured to:
   when the image forming data file includes an instruction for image formation, form the image on the sheet by controlling the forming device based on information included in the image forming data file, and
   when the image forming data file includes an instruction for wireless tag communication setting, set parameters of the wireless tag communication device based on information included in the image forming data file.

2. The apparatus according to claim 1, wherein the processor is configured to transmit type information, the type information indicating a type of the sheet, to another information processing apparatus via the external communication interface to acquire an image forming data file, the image forming data file including the instruction for wireless tag communication setting from the other information processing apparatus.

3. The apparatus according to claim 1, wherein the processor is configured to, in response to a user's operation via the external communication interface to acquire the image forming data file, receive an image forming data file including the instruction for wireless tag communication setting which is transmitted by the another information processing apparatus.

4. The apparatus according to claim 1, wherein the image forming data file includes wireless tag control data, the wireless tag control data being data for controlling a wireless tag, and the instruction for communication setting is recorded in an area of the wireless tag control data.

5. The apparatus according to claim 4, wherein the instruction for communication setting is recorded in the same format as that of an instruction for recording data in the wireless tag in the area of the wireless tag control data.

6. A control method comprising:
by an image forming apparatus including a forming device configured to form an image on a sheet, the sheet including a wireless tag, a wireless tag communication device configured to perform wireless communication with the wireless tag included in the sheet, and an external communication interface configured to acquire an image forming data file from another communication device through communication,
acquiring the image forming data file from another communication device;
forming the image on the sheet by controlling the forming device based on information included in the image forming data file when the image forming data file includes an instruction for image formation; and
setting parameters of the wireless tag communication device based on information included in the image forming data file when the image forming data file includes an instruction for wireless tag communication setting.

7. The method according to claim 6, further comprising:
transmitting type information, the type information indicating a type of the sheet, to another information processing apparatus via the external communication interface to acquire an image forming data file, the image forming data file including the instruction for wireless tag communication setting from the other information processing apparatus.

8. The method according to claim 6, further comprising:
in response to a user's operation via the external communication interface to acquire the image forming data file, receiving an image forming data file including the instruction for wireless tag communication setting which is transmitted by the another information processing apparatus.

9. The method according to claim 6, wherein the image forming data file includes wireless tag control data, the wireless tag control data being data for controlling a wireless tag, and the instruction for communication setting is recorded in an area of the wireless tag control data.

10. The method according to claim 9, wherein the instruction for communication setting is recorded in the same format as that of an instruction for recording data in the wireless tag in the area of the wireless tag control data.

11. A non-transitory computer readable medium storing instructions for a control method, the instruction when executed by a processor performing the control method comprising:
by an image forming apparatus including a forming device configured to form an image on a sheet, the sheet including a wireless tag, a wireless tag communication device configured to perform wireless communication with the wireless tag included in the sheet, and an external communication interface configured to acquire an image forming data file from another communication device through communication,
acquiring the image forming data file from another communication device through communication;
forming the image on the sheet by controlling the forming device based on information included in the image forming data file when the image forming data file includes an instruction for image formation; and
setting parameters of the wireless tag communication device based on information included in the image forming data file when the image forming data file includes an instruction for wireless tag communication setting.

12. The non-transitory computer readable medium according to claim 11, the method further comprising:
transmitting type information, the type information indicating a type of the sheet, to another information processing apparatus via the external communication interface to acquire an image forming data file, the image forming data file including the instruction for wireless tag communication setting from the other information processing apparatus.

13. The non-transitory computer readable medium according to claim 11, the method further comprising:
in response to a user's operation via the external communication interface to acquire the image forming data file, receiving an image forming data file including the instruction for wireless tag communication setting which is transmitted by the another information processing apparatus.

14. The non-transitory computer readable medium according to claim 11, wherein the image forming data file includes wireless tag control data, the wireless tag control data being data for controlling a wireless tag, and the instruction for communication setting is recorded in an area of the wireless tag control data.

15. The non-transitory computer readable medium according to claim 14, wherein the instruction for communication setting is recorded in the same format as that of an instruction for recording data in the wireless tag in the area of the wireless tag control data.

* * * * *